United States Patent [19]
Vishlitsky et al.

[11] Patent Number: 6,145,006
[45] Date of Patent: Nov. 7, 2000

[54] METHOD AND APPARATUS FOR COORDINATING LOCKING OPERATIONS OF HETEROGENEOUS HOST COMPUTERS ACCESSING A STORAGE SUBSYSTEM

[75] Inventors: Natan Vishlitsky; Erez Ofer, both of Brookline; Brian Garrett, Hopkinton, all of Mass.

[73] Assignee: EMC Corporation, Hopkinton, Mass.

[21] Appl. No.: 08/882,182

[22] Filed: Jun. 25, 1997

[51] Int. Cl.⁷ .............................. G06F 13/38; G06F 15/17
[52] U.S. Cl. .......................................... 709/229; 710/200
[58] Field of Search .................................. 395/726, 857; 711/114, 163; 710/200, 37; 709/216, 229

[56] References Cited

U.S. PATENT DOCUMENTS

| | | | |
|---|---|---|---|
| 4,733,352 | 3/1988 | Nakamura et al. | 364/200 |
| 5,367,704 | 11/1994 | Hasuo et al. | 395/800 |
| 5,408,629 | 4/1995 | Tsuchiya et al. | 395/425 |
| 5,551,046 | 8/1996 | Mohan et al. | 395/800 |
| 5,678,026 | 10/1997 | Vartti et al. | 395/479 |
| 5,734,898 | 3/1998 | He | 395/619 |
| 5,758,125 | 5/1998 | Misinai et al. | 395/500 |
| 5,768,623 | 6/1998 | Judd et al. | 395/857 |
| 5,829,048 | 10/1998 | Ofer et al. | 711/166 |
| 5,848,241 | 12/1998 | Misinai | 395/200.43 |

OTHER PUBLICATIONS

Andrew S. Tananbaum, Structured Computer Organization (2d. ed.), pp. 10–12, 1984.

*Primary Examiner*—Mark H. Rinehart
*Attorney, Agent, or Firm*—John M. Gunther; Leanne J. Fitzgerald

[57] ABSTRACT

A method of managing shared storage system resources amongst a plurality of heterogeneous host computers utilizing different operating systems is described. The method includes providing a lock mechanism which allows a host to gain exclusive control of storage system resources, including storage devices.

5 Claims, 5 Drawing Sheets

30

| BYTES | MEANING | |
|---|---|---|
| bytes 0-3 | Lock Holder | ~31 |
| bytes 4-5 | Lock Number | ~32 |
| bytes 6-7 | Lock Password, "LK" when locked | ~33 |
| bytes 8-9 | Storage System ID | ~34 |
| byte 10 | LP - ID | ~35 |
| byte 11 | Storage Controller ID | ~36 |
| bytes 12-15 | Timer Value | ~37 |

| Bytes | |
|---|---|
| byte 0 | command code: $3B — 41 |
| byte 1 | Logical unit number  reserved  mode: 'emc'=01 — 42 |
| byte 2 | Page Code — 43 |
| byte 3-5 | Feature Code and Sub Page Code — 44 |
| bytes 6-8 | transfer length — 45 |
| byte 9 | control byte — 46 |

| byte 0 | $17     (order - EMC) — 51 |
|---|---|
| byte 1 | $CE     (validity code) — 52 |
| byte 2 | Storage System Identifier — 53 |
| byte 3 | Sub Command: 00, 01, 02, or 03 — 54 |
| bytes 4-5 | Lock Number — 55 |
| byte 6-7 | Reserved — 56 |
| byte 8-11 | Lock Holder ID — 57 |
| bytes 12-15 | Reserved — 58 |

| byte 0 | $17     (order - EMC) — 61 |
|---|---|
| byte 1 | Return Code — 62 |
| byte 2-3 | Storage System Identifier — 63 |
| byte 4-7 | Lock Holder ID — 64 |
| bytes 8-11 | Current Lock Holding time (in seconds) — 65 |
| byte 12 | LP ID — 66 |
| byte 13 | Disk Controller ID — 67 |
| bytes 14-15 | Lock Password — 68 |

FIG. 4C

Get Lock Holder Command

| Return Code | Meaning |
|---|---|
| RC = 00 | Done |
| RC = 02 | Invalid Sub-Command |

FIG. 5A

Lock Command

| Return Code | Meaning |
|---|---|
| RC = 00 | Done |
| RC = 01 | Lock Not Given |
| RC = 02 | Invalid Sub-Command |
| RC = 03 | Invalid Lock Number |
| RC = 04 | Already Locked by You |

FIG. 5B

Unlock Command

| Return Code | Meaning |
|---|---|
| RC = 00 | Done |
| RC = 01 | Unlock Not Done - Diff. Holder |
| RC = 02 | Invalid Sub-Command |
| RC = 03 | Invalid Lock Number |
| RC = 05 | Unlock Not Done - No Lock |

FIG. 5C

Query Command

| Return Code | Meaning |
|---|---|
| RC = 00 | Done |
| RC = 02 | Invalid Sub-Command |
| RC = 03 | Invalid Lock Number |

FIG. 5D

METHOD AND APPARATUS FOR COORDINATING LOCKING OPERATIONS OF HETEROGENEOUS HOST COMPUTERS ACCESSING A STORAGE SUBSYSTEM

BACKGROUND OF THE INVENTION

This invention relates generally to storage systems associated with computer systems and more particularly to providing a method and apparatus for managing shared storage system resources amongst a plurality of heterogeneous host computers.

As it is known in the art, computer systems generally include a central processing unit, a memory subsystem and a storage subsystem. According to a networked or enterprise model of a computer system, the storage subsystem associated with or in addition to a local computer system, may include a large number of independent storage devices or disks housed in a single enclosure. This array of storage devices is typically connected to several computers (or hosts) via dedicated cabling or via a network. Such a model allows for the centralization of data which is to be shared among many users and also allows a single point of maintenance for the storage functions associated with the many computer systems.

One type of storage system known in the art is one which includes a number of disk storage devices configured as an array (sometimes referred to as Redundant Array of Independent Disks or RAID). Such a system may include several arrays of storage devices. In addition to the arrays of storage devices, typical storage systems include several types of controllers for controlling the various aspects of the data transfers associated with the storage system. One type of controller is a host controller and provides the interface between the host computers and the storage system. Another type of controller is a disk controller. There may be one or more disk controllers for each array of storage devices in a storage system. The disk controller manages the transfer of data to and from its associated array drives.

The storage systems described above are typically used to supply storage services for several host computers. Each of these host computers may at some point in time have access to the same logical drives within the storage system. This type of access may cause one host computer to disrupt the operations associated with another host computer. In addition, at some point in time one host may need to prevent all other hosts from accessing the entire storage system.

Generally, to prevent two disparate host computers from effecting the operations of each other with respect to storage services, a system of locks may be employed. These locks should allow one host computer to gain exclusive control over a particular storage resource or in some instances the entire storage system. Ideally, the locking scheme should be useful for any host attached to the storage system regardless of type (e.g. mainframe or open systems).

Previous methods of locking resources within a storage subsystem have been limited to locking particular records associated with database files. Additionally, previous locking mechanisms have been limited to a single processor (i.e. host computer) or have been limited to a single type of host computer connected to a storage system. Since, as described above, today's storage subsystems may provide storage services for both mainframe and open systems type computers simultaneously, these prior art lock mechanisms are not robust. It would be advantageous therefore to provide a universal lock mechanism where one host computer would be able to lock out other host computers, regardless of type, from using a storage system or resources within the storage system.

SUMMARY OF THE INVENTION

In accordance with the present invention, a storage system is provided which includes a plurality of storage resources. The storage system resources are each accessible by a plurality of heterogeneous host computers coupled to the storage system. It is anticipated that the plurality of heterogeneous host computers share common storage system resources. The sharing of the resources is managed by a resource manager within the storage system. The resource manager implements a locking scheme in order to prevent conflicts over shared resources. The locking scheme involves providing a plurality of locks where each lock corresponds to each of the plurality of resources. In addition, each of the locks is settable to locked and unlocked states. The resource manager includes a lock setting means which is responsive to a signal received from the host computers for setting the lock in the locked or unlocked states. When a lock for a particular resource has been set by a host computer, no other host computer may access that storage system resource. Exclusive control over the resource is maintained until the lock is released by the same host which set the lock.

The signals to which the resource manager is responsive include blocks of data which may be transmitted to the storage system over any bus of any communication protocol. Typically, the data blocks are transmitted in order to overload a command of the communication protocol an thus provide additional functionality to the protocol (i.e. a new command). Here, a set of commands are provided for manipulating the locks and for getting status reports associated with the locks. With such an arrangement, storage system resources may be shared amongst a plurality of heterogeneous host computers even though the different host computers may not communicate with each other.

BRIEF DESCRIPTION OF THE DRAWINGS

The above and further advantages of the present invention may be better understood by referring to the following description taken into conjunction with the accompanying drawings in which:

FIG. 3 is a diagram of an exemplary one of the lock records used in the present invention;

FIGS. 4A–4C are diagrams of the data blocks transmitted by a host computer in order to perform the locking functions associated with the present invention; and FIGS. 5A–5D are tables showing the possible return code values associated with executing the locking commands of the present invention.

DETAILED DESCRIPTION OF THE PREFERRED EMBODIMENT

Figure 1:
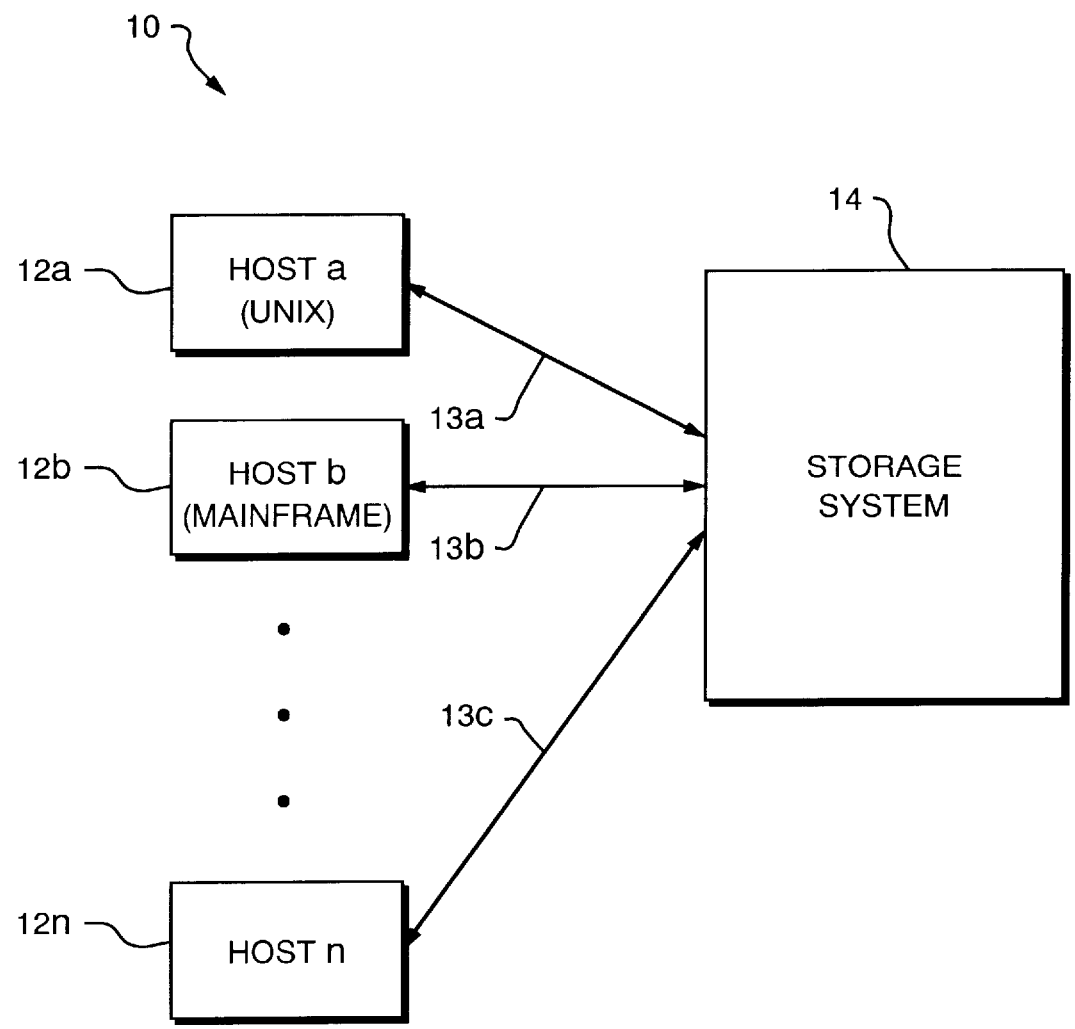
FIG. 1 is a block diagram of a computer system including a mass storage system incorporating the present invention.

Referring now to FIG. 1, computer system 10 is shown to include, among other things, a plurality of host computers 12a–12n, coupled to a storage system 14 via communication paths or busses 13a–13n respectively. The host computers may each be any of a well-known type of computer system. For example, host 12a may be a mainframe computer or may be an open-systems computer or alternatively may be a personal computer. Since each of the computer systems just mentioned typically communicates using a specific communication protocol buses 13a–13n will correspondingly be those buses specific to the computer system to which they are coupled. That is for example, assuming host 12b is an open-systems type computer system (e.g. running the UNIX Operating System) bus or communication path 13b would typically be a Small Computer Systems Interface or SCSI type communications path or a fibre-channel communications path. All communications over bus 13b would therefore adhere to the SCSI or fibre-channel communications protocol respectively. Alternately, if host 12a were a mainframe type computer, then bus 13a would likely be an Enterprise Systems Connection or ESCON communications path and communications over bus 13a would adhere to the ESCON communications protocol. Thus, according to the preferred embodiment, storage system 14 is capable of providing storage services to varied array of computer system platforms simultaneously.

Figure 2:
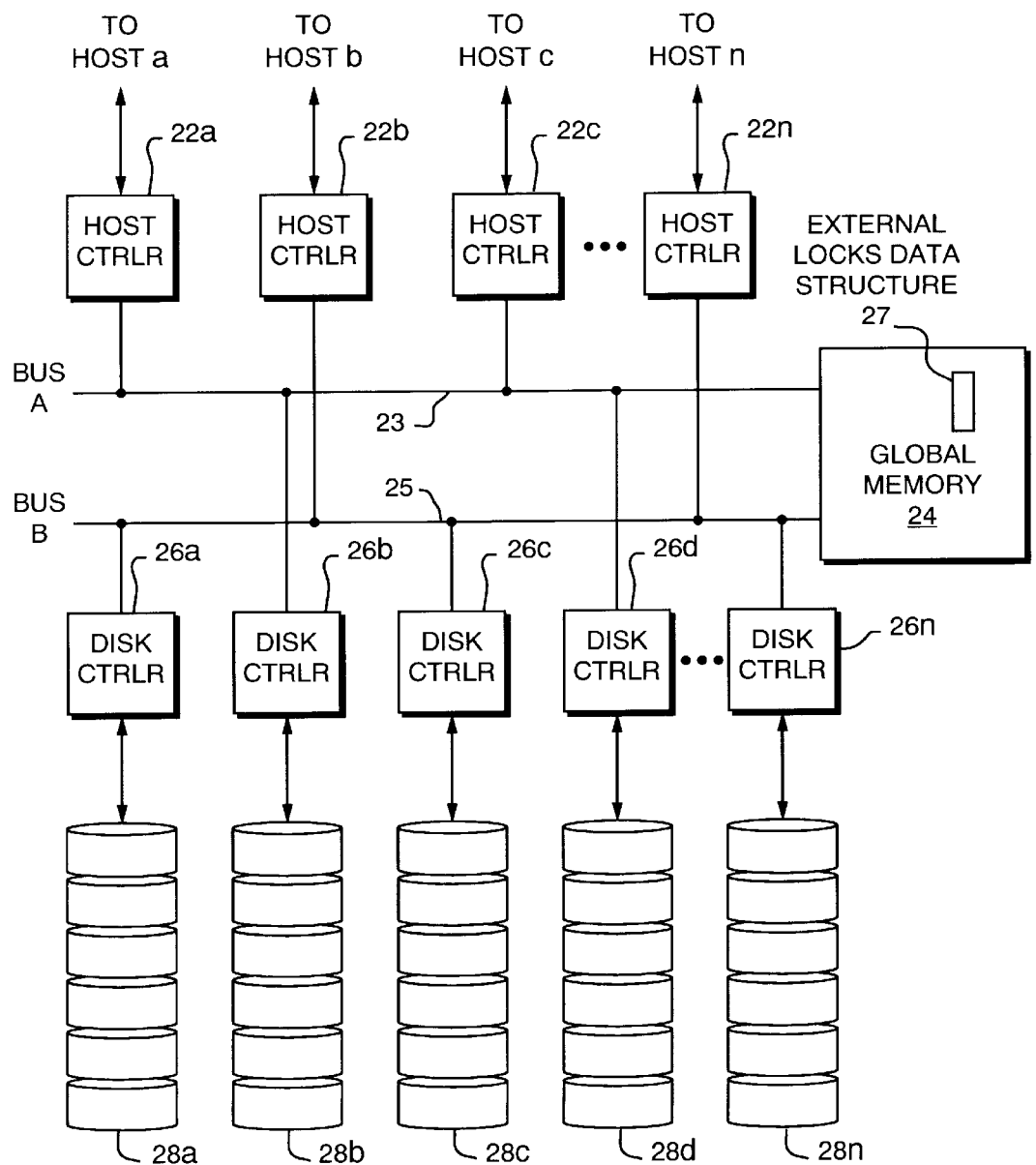
FIG. 2 is a diagrammatic representation of the storage system of FIG. 1.

The storage system 14 of computer system 10 may be a mass storage system which, as will be described in more detail below, includes several individual components coupled via an internal communications path. The communications path may include one or more buses. Referring now to FIG. 2 the storage system 14 of FIG. 1 is shown in more detail. Here the storage system includes a plurality of host controllers 22a–22n which are, according to a preferred embodiment of the present invention, coupled alternately to buses 23 and 25. Each host controller 22a–22n is responsible for managing the communication between its associated attached host computer(s) and storage system 14. Also coupled alternately to buses 23 and 25 are a plurality of disk controllers 26a–26n. Coupled to each disk controller is an array of storage devices which as shown here may be magnetic disk devices. As with the host controllers described above, each disk controller is responsible for managing the communications between its associated array of disk drives and the host controllers or memory 24 of storage system 14. Each of the disks within a disk array may be considered a storage system resource and as such may be shared among all attached hosts.

Also coupled to both buses 23 and 25 is global memory 24. According to a preferred embodiment of the present invention, global memory 24 serves as a very large cache which is used during the transfer of data between the host computers and the disks of disk arrays 28a–28n. As will be described in detail below, the memory 224 is also used to maintain a number of lock records associated with the storage system resources.

To aid in understanding the context of the invention, a general operational description of the storage system of FIG. 2 is set forth. During operation, a host may desire to read data from or write data to one of the disk arrays contained within the storage system 14. In order to do so, the host computer would send a request over its associated bus (for example bus 13a) to the controller attached to that bus (here controller 22a). The controller, once it receives the request from the host computer, then begins performing those tasks necessary to satisfy the request from the host. For example, if the request by the host was to write some portion of data to one of the disks in any of disk arrays 28a–28n, the host controller receiving the request would begin writing the data received from the host to the global memory 24. Once all of the data was written to global memory 24, the host controller may send an acknowledge signal back to the host computer indicating that the data was received. Sometime thereafter one of the disk controllers 26a–26n, depending on the target disk array, will begin reading the data from the global memory and writing it to the associated target disk device.

Alternately, if the request received from the host computer was to read data from one of the disk arrays 28a–28n, the host controller would first look to the global memory 24 to determine if the data was already resident in the global memory (as may be the case if a previous read was performed for the same data). If the data is resident in the global memory, this would be known as a cache hit and the host controller would begin reading the data from the global memory and delivering it to the host. On the other hand, if the data was not resident in global memory, this would be considered a cache miss and the associated disk controller would then begin reading the data from the corresponding disk device of the host request. The data read would be placed into the global memory 24. The host controller would then read the data from the global memory 24 and deliver it to the requesting host device.

Each of the host controllers of storage system 14 is generally configured to be coupled to one type of computer system. That is, continuing with the example above, if the computer system 12a (FIG. 1) where a mainframe type of computer coupled via bus 13a (FIG. 1) to storage system 14, then host controller 21a would be a mainframe host controller. Similarly, if computer system 12b (FIG. 1) where an open systems computer controller 21b would be an open systems host controller. Since mainframe computers and open systems computers typically communicate using the ESCON and SCSI communications protocols respectively, controllers 21a and 21b of the preferred embodiment will be ESCON and SCSI controllers respectively. The remaining controllers of storage system 14 may be of either the open systems or mainframe variety.

Each controller of storage system 14 may be capable of supporting a number of attached host computers. That is for example, controller 21b may have four input channels and thus be capable of supporting (i.e. managing input/output services) for four open systems host computers. Each host attached to a single host controller may have access to the same of different storage devices within the storage system.

During operation of the storage system 14, it may be necessary for one host computer to have exclusive control over certain storage devices within the system. One example of when one host may require exclusive control over a particular storage devices occurs when the device is shared by more than one host. In this case, in order to prevent one host from interfering with the operations of another host. Additionally, there are certain circumstances when one host will require exclusive control of the entire storage system. This may occur for example when a host driven reconfiguration of the storage system is to be performed.

In accordance with the present invention, a locking mechanism is provided within storage system 14 which allows an attached host to lock particular storage system resources or the entire storage system. The lock mechanism is recognized and useable by heterogeneous hosts attached to the storage system. That is, the lock mechanism of the present invention is visible to and settable by both mainframe and open systems computers simultaneously attached to storage system 14. With the lock mechanism of the present invention, cross platform coordination of storage system operations may be achieved.

According to the preferred embodiment of the present invention, the locks associated with the lock mechanism of the present invention are maintained as the External Locks data structure 27 in the global memory 24 of storage system 14. By implementing a specialized set of storage system commands, each host, via its associated host controller, may access the global memory 24 to read and/or set the storage system locks. The number of lock records in existence at any given time during operation of storage system 14 is dependent on the number of outstanding locks.

Referring now to FIG. 3 an exemplary one of the lock records is shown as data structure 30. Lock record data structure 30 is one of a plurality of lock records included within External Locks data structure 27 (FIG. 2). Lock record 30 includes eight entries 31–37. Each entry contains information about the lock and the process which is holding the lock. Remember, a lock record exists only if the lock is outstanding (i.e. being held by a process running on a host attached to the storage system).

Still referring to FIG. 3, entry 31 of lock record 30 includes Lock Holder field which is an identification of the host application which is holding the lock. In particular, when a host application gets or sets a lock, it must provide an identification unique to that application. That is, each process or application which is attempting to share resources within storage system 14 must have a unique Lock Holder ID. In the preferred embodiment, the Lock Holder Id is a 32 bit value. In order to unlock a resource (i.e. release a lock) the Lock Holder Id of the application attempting to release the lock must match the value in entry 31.

Entry 32 of lock record 30 includes the Lock Number field. The Lock Number field is used to store the identity of a particular lock (i.e. resource being locked). Thus when an application wishes to lock a resource it fills entry 32 with the number associated with that lockable resource. According to the preferred embodiment, the acceptable values for the Lock Numbers are in the range of 0–2F (hex). It should be noted that any number of Lock Numbers may be provided and is only limited by the number of resources which may be lockable within a system. Also according to the preferred embodiment, locks having lock numbers from 0-F (hex) are known as general locks. General locks are here used to provide a lock on an entire storage system cabinet. More particularly, Lock Number 0 is a global lock and is reserved for applications that require no other application operate the storage system at the same time as the application holding the lock. Examples where entire system locks may be required are for performing storage system reconfiguration or when synchronizing an active and backup storage system. The remaining locks numbers are used for other application specific locks which need to lock shared storage system resources.

Entry 33 of the lock record is the Lock Password. This field is used to indicate whether a particular lock is locked or unlocked. In the preferred embodiment, the Lock Password is stored as an ASCII value. Thus for example, if the lock was set the ASCII value stored in entry 33 might be "LOCKED" or some other similar ASCII string. Similarly if the lock was not set the ASCII value might me "UNLOCKED".

Entry 34 is used to identify the particular storage system for which the locked is being held. This may be used when a single host is coupled to more than one storage system.

Entry 35 is used to identify the logical path to a particular device. A logical path is the path from the host computer through a particular input channel of one of the host controllers 22a–22n through which the lock command was received. In particular it is used to identify which logical path was used to access the lock record, and which logical path should be used to return any data to the host computer.

Entry 36 in lock record 30 is used to identify a particular controller (e.g. controller 26b (FIG. 2)) in storage system 14. The value store in entry 36 will typically be the identity of the disk controller associated with the resource (e.g. logical volume) which is the subject of the lock.

Lastly, entry 37 of lock record 30 is used to store a time value. The time value is used to indicate the length of time (in seconds) that the lock has been outstanding. This may be useful in determining if a host computer has mismanaged the lock. That is, it may indicate that the host neglected to reset the lock when it was through with the associated resource. It may also indicate that the host holding the lock has had a fatal error. In any event, other host applications may, in some instances force the release of a lock if the timer value has passed a certain threshold.

According to the present invention, the storage system locks described above are manipulated through the use of specialized storage system commands. Generally the specialized commands are achieved by using standard storage system commands in unique ways to perform functions not necessarily defined by the communication protocols associated with the host computers attached to storage system 14. For example, for open systems type host computers, the SCSI read buffer and write buffer commands are used in a unique way to set, release, and examine locks. Similar commands are used by mainframe computers communicating over ESCON channels in order to manipulate the same storage system locks.

Referring now to FIG. 4A, an example of the SCSI write buffer command 40 used to implement the lock features of the present invention is shown. Note, that although the command to be described is in a format suitable for transmission according to the SCSI communications protocol, similar information may be transmitted to the storage system using other commands of suitable for other protocols. As such, the SCSI implementation described herein should not be seen as a limitation of the present invention.

As mention briefly above, and according to the preferred embodiment of the present invention, the SCSI commands utilized to effect lock operations are the "write buffer" and "read buffer" commands. Generally the write buffer transaction includes two transmissions of data. The first transmission includes sending command information to the storage system. The command information is used by the storage system to define the operations to be performed on the data received during the data phase of the write buffer transaction.

Referring now to FIGS. 4A–4B and first to FIG. 4A, a command block 40 is shown to depict the data transmitted by a host computer during the so called command phase of a SCSI write buffer transaction. Entry 41 of command block 40 includes the command identifier. According to the SCSI communication protocol, the value $3B indicates that a write buffer command transaction is taking place. Entry 42 includes several pieces of information. The piece of information relevant to the present invention is the mode section of entry 42. This is the area where the issuing controller of storage system 14 that an external lock command is going to be executed. That is, the feature code and sub page code information informs the storage system host controller that the data section (to be described below) of the write buffer transaction will include information which is to be used to perform one of the available lock functions. Entry 46, the control byte field is used to coordinate the two phases of a transaction and to also match any return data with the proper write buffer (i.e. lock) command.

FIG. 4B depicts a data block 50 which is transmitted by a host computer during the data phase of a write buffer transaction. The information in entries 51 and 52 is used by the recipient storage controller to verify that the data block is being used for a vendor unique command. Entry 53 is the field used to identify the command as being one which is going to perform some operation with respect to the storage system locks. Entry 53 identifies the particular lock command which is to be performed. Here, the possible values for the lock command are 00, 01, 02, and 03 corresponding respectively to the "GET HOLDER", "LOCK", "UNLOCK", and "QUERY" commands. As will be described further below, each of these commands causes the storage system to perform an associated function with respect to the locks.

Entry 55 of data block 50 identifies the particular storage system lock which is the subject of the associated command identified in entry 54. Entry 57 identifies the host application which is performing the operation on the lock (i.e. transmitting the lock command via the SCSI write buffer transactions).

Each command executed in order to perform lock functions has associated return data. That is, the storage system will generate response data which may include requested information or with a status report. In order for the host computer to get the return data, it must perform a SCSI "read buffet" transaction. Like the write buffer command, the read buffer command is a two phase transaction having a command and data phase. The command portion of a read buffer transaction which is initiated to retrieve data associated with a previously issued lock command (via a write buffer transactions) will look identical to the command section 40 of FIG. 4A except that the command code in field 41 will be the value $3C rather than the value $3B shown in the figure.

Turning now to FIG. 4C, the data section of a read buffer transaction is shown. As with the write buffer data section, entry 61 is used to transmit information identifying the return data as being related to a vendor unique command. Entry 62 includes the most pertinent information transmitted by the storage system in response to a lock command. The information in entry 62 is the return code value. As will be described in detail below, the return code may be any one of several values and generally gives information about the success or failure of the attempted lock command.

Entries 63 and 64 are used to identify the return data. Entry 63 identifies the particular storage system returning the data to the host computer while entry 64 identifies the particular host process which initiated the lock command. Should the lock command be one which is requesting the status of a lock, entry 65 will contain a time value which represents how long the lock has been held. This information may be useful in determining whether force a release of the lock. A forced release of the lock may be warranted if a particular process set a lock and then terminated without releasing the lock. Rather than allowing the resource to remain locked indefinitely, a forced release may be performed.

Entries 66, 67, and 68 are used to return data from entries 35, 36, and 33 respectively of lock record 30 (FIG. 3). The meaning associated with each of these field entries was described above in connection with the lock record data structure of FIG. 3.

The operation of storage system 14 with respect to lock and locking commands will now be discussed. As mentioned above, the preferred embodiment of the present invention implements four lock commands. Although the preferred embodiment implements only four commands, other commands may be implemented and thus the four commands described herein should not be seen as a limitation of the present invention.

The first of the four lock commands is the LOCK Command. This command is issued by a host, via a write buffer transaction described above, in order to lock a resource of storage system 14 (FIG. 2). Upon receipt, the storage system will execute the command by attempting to create a lock record similar to the lock record shown in FIG. 3. The storage system will either grant the lock if the lock is not already outstanding, or will deny the request. In either case, a return code is sent to the host, via a host initiated read buffer transaction, in order to inform the host of the results of the lock command. According to the preferred embodiment and as shown in FIG. 5B, there are five possible return codes associated with performing a LOCK Command. A return code of 00 indicates that the lock was granted to the requesting host. A return code of 01 indicated that the lock was not given to the requesting host. A return code of 02 indicates that the host application issuing the command specified and invalid sub-command. A return code of 03 indicates that the host application issuing the LOCK command transmitted an invalid lock number in the LOCK Command (i.e. specified a lock number of a resource which was not lockable by that application). A return code of 04 indicates that the lock sought by the host application is already locked and the lock was obtained by the same application which is seeking it again. This may indicate that the same application neglected to release the lock when it no longer need to have the lock on the storage system resource.

The second lock command is the UNLOCK Command. As may be expected, this command is used by an application to release a previously set lock of a storage system resource. Like the LOCK command, the LNLOCK Command has an associated set of possible return codes. The return code list for the UNLOCK Command is shown in FIG. 5C. Return codes 00, 02, and 03 carry the same meaning as described above for the LOCK Command. Return code 01 indicates that the UNLOCK Command was unsuccessful for the reason that the lock was originated (i.e. set) by a different process. Return code 05 also indicates that the attempted UNLOCK Command was unsuccessful for the reason that the lock was not set. Each of these return codes may be used to indicate an operational error within the host application attempting to execute the UNLOCK Command.

The third lock command is the GET LOCK HOLDER Command. This command is used to assign a host application the required Lock Holder ID. Remember that each application which wishes to manipulate the locks of the storage system needs to have a unique Lock Holder ID. Since the various hosts attached to the storage system may not communicate with each other, the storage system manages the assignment of ID's. The return code for successful completion is 00 while a return code of 02 indicates that an invalid sub-command was transmitted (see FIG. SA).

The fourth lock command is the QUERY Command. This command is used to gather information about a particular lock within the storage system. The return codes (as shown in FIG. 5D) are 00, 02, and 03. Each of these return codes carry the same meaning as describe previously with respect to other lock commands.

It should be noted that in addition to the return code, other information about the locks for storage system 14 may be returned in the data block (FIG. 4C) which is transmitted to the host computer during a read buffer transaction following the write buffer transaction which initiated the particular lock command. Depending on the command the data returned in certain of the fields is meaningful. For example, a QUERY command will return enough in formation in fields 62–68 to determine if a lock is held, the ID of the application holding the lock, the storage system resource associated with the lock, and the amount of time the lock has been outstanding.

Having described a preferred embodiment of the present invention, it will now become apparent to those of skill in the art that other embodiments incorporating its concepts may be provided. It is felt therefore that this invention should not be limited to the disclosed embodiment but rather should be limited only by the spirit and scope of the appended claims.

What is claimed is:

1. A storage system having a plurality of resources accessible by a plurality of heterogeneous host computers coupled to said storage system wherein said plurality of heterogeneous host computers share said resources and wherein access to said shared resources is managed by a resource manager within said storage system, said resource manager comprising:

a plurality of locks corresponding to said plurality of resources each of said locks being settable to locked and unlocked states; and a lock setting means for setting said lock to said locked and unlocked states wherein when one of said locks corresponding to one of said plurality of resources is placed in said lock state by one of said plurality of host computers, said one of said plurality of host computers gains exclusive control of said resource.

2. The resource manager of claim 1 wherein said resources are storage devices within said storage system and wherein ones of said storage devices are accessible by each of said heterogeneous host computers.

3. The resource manager of claim 1 wherein each of said plurality of locks comprises a data structure stored in a memory of said storage system, said data structure including fields for identifying which of said resources is locked, which of said heterogeneous host computers has set the lock, and a timer value associated with an elapsed time corresponding to a time period for which the lock has been set.

4. The resource manager of claim 2 wherein said lock setting means includes a processor for receiving commands from said heterogeneous host computers and for writing data to said data structures in order to lock or unlock resources.

5. A method of managing a plurality of resources within a storage system coupled to a plurality of heterogeneous host computers comprising the steps of:

in response to a request from one of said host computers, assigning a lock holder identification to one of said of host computers;

in response to a lock command issued by said host computer having said lock holder identification, creating a lock data structure in a memory of said storage system, said lock data structure including information identifying said host computer, identifying one of said resources being locked by said host computer, and in a timer value for tracking an elapsed time for which said lock has been held;

entering information in said lock data structure to indicate that said resource is locked;

while said resource is locked, denying access to said resource by others of said plurality of host computers.

* * * * *

UNITED STATES PATENT AND TRADEMARK OFFICE
CERTIFICATE OF CORRECTION

PATENT NO. : 6,145,006
DATED : November 7, 2000
INVENTOR(S) : Vishlitzky, et al.

It is certified that error appears in the above-identified patent and that said Letters Patent is hereby corrected as shown below:

<u>Title page, item [75],</u>
Inventor spelling is Natan Vishlitzky (not Vishlitsky).

Signed and Sealed this

Thirtieth Day of October, 2001

*Attest:*

*Attesting Officer*

NICHOLAS P. GODICI
*Acting Director of the United States Patent and Trademark Office*